C. B. JOSLIN.
CORN TESTING CABINET.
APPLICATION FILED JUNE 3, 1908.
910,825.
Patented Jan. 26, 1909.
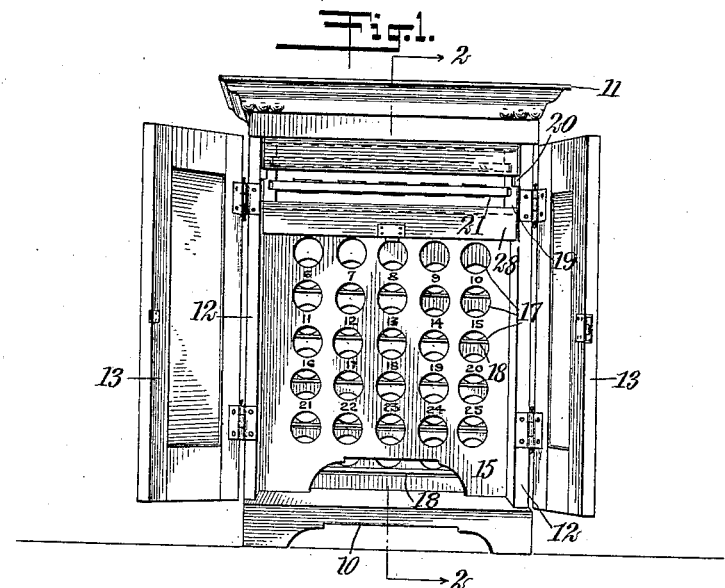
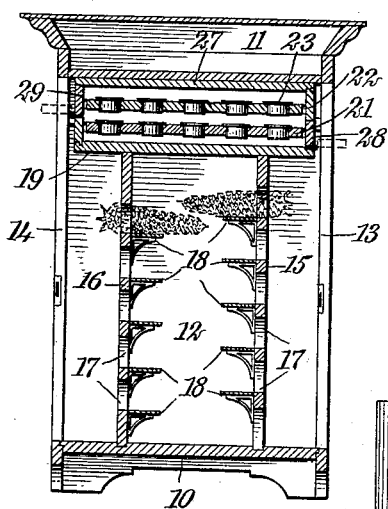
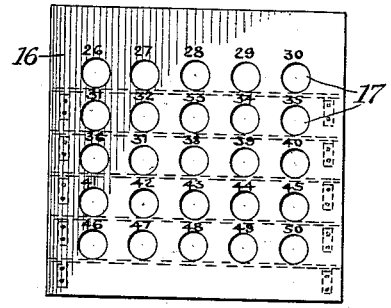
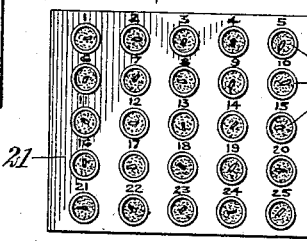
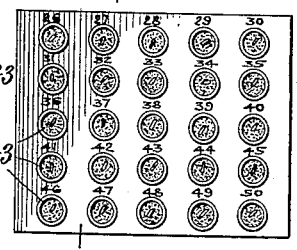
WITNESSES
INVENTOR
Clarence B. Joslin
BY
ATTORNEYS

UNITED STATES PATENT OFFICE.

CLARENCE BENJAMIN JOSLIN, OF MANCHESTER, IOWA.

CORN-TESTING CABINET.

No. 910,825.        Specification of Letters Patent.        Patented Jan. 26, 1909.

Application filed June 3, 1908. Serial No. 436,396.

*To all whom it may concern:*

Be it known that I, CLARENCE B. JOSLIN, a citizen of the United States, and a resident of Manchester, in the county of Delaware and State of Iowa, have invented a new and Improved Corn-Testing Cabinet, of which the following is a full, clear, and exact description.

This invention relates to certain improvements in means for testing seed corn to determine its germinating properties, and more particularly to a cabinet adapted to support a plurality of ears of corn in separate compartments, and to later support a plurality of germinating cups. The number of cups corresponds to the number of ears, so that a few kernels may be removed from each ear and placed in the corresponding cup, and after having been permitted to germinate or sprout, the different seedlings may be identified with the ear from which the kernels were taken.

Reference is to be had to the accompanying drawings, forming a part of this specification, in which similar characters of reference indicate corresponding parts in all the figures, and in which—

Figure 1 is a front view of a cabinet constructed in accordance with my invention, the doors thereof being open; Fig. 2 is a vertical section on the line 2—2 of Fig. 1; Fig. 3 is a view of the ear-support located behind the one shown in Fig. 1; Fig. 4 is a top plan view of one of the germinating trays; Fig. 5 is a top plan view of a second germinating tray; and Fig. 6 is a vertical section through one of the germinating cups.

The specific cabinet shown in the accompanying drawings, includes a base 10, a top 11, end walls 12, front doors 13 and rear doors 14. Within the cabinet and occupying the lower portion thereof, I provide means for supporting a plurality of ears of corn in separate numbered compartments. This means may be of any suitable character, but I preferably provide two vertical partition walls 15 and 16, each having a plurality of openings or apertures 17 therethrough, of a size suitable to receive an ear of corn. The two partitions are spaced apart a suitable distance, for instance, six inches, and the openings of one partition wall or supporting wall are arranged out of alinement with the openings in the other wall, so that when the ears of corn are inserted in the openings of both walls, the inner ends of said ears will pass each other, and the space within the cabinet will be utilized in the most economical manner. The openings of each wall are preferably arranged in horizontal rows, the openings in each row being directly above those in the row beneath. Extending across the inner surface of each row, I provide a plurality of shelves 18, the upper surface of each of which is adjacent the lower edge of a corresponding row of openings 17. The shelves may be secured to the partitions by any suitable form of bracket, and they serve not only to support the inner portions of the ears, but also serve to strengthen and reinforce the partitions.

Above the two partitions and occupying the upper portion of the cabinet, I provide a drawer 19, supported on suitable guides 20 and removable from the cabinet upon the opening of either the front doors 13 or the rear doors 14. The drawer supports a plurality of trays corresponding in number to the number of partition walls and each provided with as many cup-receiving apertures as there are ear-receiving apertures. When two partitions 15 and 16 are employed, the drawer supports two trays 21 and 22, each held in grooves in the sides of the drawer. The apertures in one tray are arranged in the same order as are the apertures in the corresponding partition wall, and within each aperture is mounted a small cup 23, adapted to receive a few kernels of corn while they are germinating. The cup may be formed of metal, porcelain, glass, or any other suitable material, and is provided with a pad 24 of felt in the bottom thereof and a similar pad 25 serving as a cover. The last-mentioned pad may be provided with any suitable form of tab or handle 26, whereby it may be readily removed from the cup. The drawer may, if desired, be provided with a top wall 27, and the opposite ends of the drawer are preferably provided with hinged closures to permit the sliding removal of the trays. As shown, the tray 21 may be removed only upon the opening of the hinged closure 28 at one end of the drawer, and the tray 22 can be removed only upon the opening of the hinged closure 29 at the opposite end of the drawer.

Each of the openings or apertures in the supporting partitions is numbered and the cup or the aperture therefor in the trays is correspondingly numbered, so that there is provided one cup for each ear of corn, and the ear corresponding to each cup may be readily determined. In using the device, a few kernels are removed from each ear and placed in the cup corresponding thereto. The felt pads of the cups are moistened to the desired extent, and the cabinet permitted to stand for a few days while the corn sprouts. The kernels in each tray may then be examined and the exact germinating qualities of the corn on the several ears may thus be determined. Thus, ears from which the kernels produced the best sprouts could then be used for seed corn, while the ears from which the corn did not sprout or sprouted very poorly could be discarded.

The drawer is made removable from the cabinet, so that the drawer may be readily transported to keep it in a room of the desired temperature. The temperature required for sprouting may prove injurious to the corn remaining on the ears, and, therefore, the cabinet is so constructed that the ears need not be subjected to the effects of warmth and moisture as are the kernels in the cups.

I have illustrated a device in which there are provided but two supporting partitions and two trays, each of which is provided with twenty-five apertures, thus permitting the testing of fifty ears of corn simultaneously, but it is evident that the construction may be made of any size desired and a greater or less number of partitions, trays and apertures be provided. It is also evident that a cabinet of this nature could be employed for testing other seed than corn.

Having thus described my invention, I claim as new and desire to secure by Letters Patent:

1. A cabinet having doors upon opposite sides thereof, vertically-disposed partitions within said cabinet and each in front of one of said doors, said partitions being provided with a plurality of apertures adapted to receive a corresponding number of ears of corn, said apertures being arranged in staggered relationship, whereby the ears within the apertures of one partition are out of alinement with the ears in the apertures of the opposite partition, and means within said cabinet and above said partitions for supporting a plurality of seed-germinating cups.

2. A cabinet having two substantially parallel vertical partitions mounted therein, each having a plurality of apertures adapted to receive a number of ears of corn, doors upon opposite sides of said cabinet, whereby access may be gained to either of said partitions, a drawer above said partitions, a plurality of trays supported by said drawer a portion of said trays being removable from the drawer and the cabinet at one side thereof and the remainder of said trays being removable from the drawer and the cabinet from the opposite side thereof, and a plurality of seed-germinating cups carried by said trays.

3. A cabinet having oppositely-disposed vertical partitions provided with apertures adapted to receive a corresponding number of ears of corn, oppositely-disposed doors for said cabinet, whereby access may be gained to either of said partitions, and a plurality of slidable trays mounted above said partitions, certain of said trays being removable upon the opening of one of said doors and the remainder of said trays being removable upon the opening of the opposite door.

4. A cabinet having means for supporting a plurality of ears of corn, a drawer removable from said cabinet, a plurality of trays within said drawer, and a plurality of seed-germinating cups carried by each of said trays, certain of said trays being removable from one side of said drawer and the remaining trays being removable from the opposite side of said drawer.

5. A cabinet having two oppositely-disposed partitions, each having a plurality of apertures therein, the apertures in one partition being in staggered relationship with the apertures in the other partition, a plurality of shelves carried by said partitions, adjacent said apertures, for supporting the ears of corn inserted through said apertures, a drawer removable from said cabinet, a plurality of trays within said drawer and corresponding in number to the number of partitions, and a plurality of seed-germinating cups carried by said trays and corresponding in number to the number of apertures in said partitions.

In testimony whereof I have signed my name to this specification in the presence of two subscribing witnesses.

CLARENCE BENJAMIN JOSLIN.

Witnesses:
JOHN H. PETERS,
R. R. JOSLIN.